United States Patent
Kim et al.

(10) Patent No.: US 9,243,160 B2
(45) Date of Patent: Jan. 26, 2016

(54) COMPOSITION FOR HARD COATING AND SHEET FOR FORMING HARD COATING HAVING SUPERIOR LOW-TEMPERATURE FORMABILITY AND SLIP PROPERTIES

(75) Inventors: Jin-Woo Kim, Daejeon (KR); Yun-Bong Kim, Daejeon (KR); Won-Kook Kim, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 13/980,532

(22) PCT Filed: Apr. 5, 2012

(86) PCT No.: PCT/KR2012/002547
§ 371 (c)(1),
(2), (4) Date: Jul. 18, 2013

(87) PCT Pub. No.: WO2012/141452
PCT Pub. Date: Oct. 18, 2012

(65) Prior Publication Data
US 2013/0302551 A1    Nov. 14, 2013

(30) Foreign Application Priority Data

Apr. 15, 2011 (KR) .................. 10-2011-0035261

(51) Int. Cl.
*C09D 137/00* (2006.01)
*C08F 220/32* (2006.01)
(Continued)

(52) U.S. Cl.
CPC ............ *C09D 137/00* (2013.01); *C08F 220/32* (2013.01); *C08G 18/4277* (2013.01); *C08G 18/6705* (2013.01); *C08G 18/792* (2013.01); *C09D 133/068* (2013.01); *C09D 175/14* (2013.01); *C09J 7/026* (2013.01); *C08F 2800/20* (2013.01); *C09J 2433/006* (2013.01); *C09J 2469/006* (2013.01); *Y10T 428/1452* (2015.01);
(Continued)

(58) Field of Classification Search
CPC   C09D 137/00; C09D 133/068; C08F 220/32; C09J 7/026
USPC ......................................................... 524/507
See application file for complete search history.

(56) References Cited

U.S. PATENT DOCUMENTS 5,093,386 A * 3/1992 Bishop et al. .................... 522/96
5,437,926 A * 8/1995 Takahashi et al. ............. 428/332
(Continued)

FOREIGN PATENT DOCUMENTS

CN       1708522 A    12/2005
CN     101410463 A     4/2009
(Continued)

OTHER PUBLICATIONS

Paint and Coating Industy, Polycarbonate Diols, Sep. 2007.*
(Continued)

*Primary Examiner* — John Uselding
(74) *Attorney, Agent, or Firm* — Hauptman Ham, LLP

(57) ABSTRACT

A sheet for forming a hard coating having outstanding low-temperature formability and slip properties and a composition for hard coatings used therefor are disclosed. The sheet for forming a hard coating includes a coating layer formed on one side thereof and containing a hard coating composition prepared by blending a UV curable resin having a (meth) acryloyl functional group with a bi- or higher valent polycarbonate.

15 Claims, 1 Drawing Sheet

(51) Int. Cl.
*C09J 7/02* (2006.01)
*C09D 133/06* (2006.01)
*C08G 18/67* (2006.01)
*C08G 18/79* (2006.01)
*C09D 175/14* (2006.01)
*C08G 18/42* (2006.01)

(52) U.S. Cl.
CPC ...... *Y10T 428/24851* (2015.01); *Y10T 428/265* (2015.01)

(56) References Cited

U.S. PATENT DOCUMENTS

| | | | |
|---|---|---|---|
| 2006/0051549 A1* | 3/2006 | Mano | 428/40.1 |
| 2006/0167126 A1 | 7/2006 | Goto et al. | |
| 2009/0054544 A1 | 2/2009 | Isogai et al. | |
| 2011/0144279 A1* | 6/2011 | Uchida et al. | 525/301 |
| 2012/0168074 A1* | 7/2012 | Kim et al. | 156/306.6 |

FOREIGN PATENT DOCUMENTS

| | | | | |
|---|---|---|---|---|
| JP | 2004-059607 | * | 2/2004 | ............ C08G 18/67 |
| JP | 2010084120 | | 4/2010 | |
| KR | 101029340 | | 11/2008 | |
| KR | 1020100026013 | | 3/2010 | |
| TW | 201130880 A | | 9/2011 | |
| WO | 2010090116 | | 8/2010 | |

OTHER PUBLICATIONS

Machine translation of JP 2004-059607. Feb. 2004.*
Oxymer M112 Data Sheet. Apr. 2009.*
International Search Report mailed Oct. 31, 2012 for PCT/KR2012/002547, citing the above reference(s).
Chinese Office Action dated Apr. 3, 2015, citing the above reference(s).

* cited by examiner

COMPOSITION FOR HARD COATING AND SHEET FOR FORMING HARD COATING HAVING SUPERIOR LOW-TEMPERATURE FORMABILITY AND SLIP PROPERTIES

CROSS REFERENCE TO RELATED APPLICATION

This application claims the priority of Korean Patent Application No. 10-2011-0035261, filed on Apr. 15, 2011 in the KIPO (Korean Intellectual Property Office). Further, this application is the National Phase application of International Application No. PCT/KR2012/002547 filed on Apr. 5, 2012, which designates the United States and was published in Korean.

TECHNICAL FIELD

The present invention generally relates to a technology for forming a hard coating on a surface of a molded article, and more particularly, to a sheet for forming a hard coating having outstanding low-temperature formability and slip properties and a composition for hard coatings used therefor.

BACKGROUND ART

For various molded articles including resin molded articles, surface hard coating is performed to provide scratch resistance, chemical resistance, and other properties to surfaces of the molded articles. Surface hard coating generally employs a sheet for forming a hard coating. The sheet for forming a hard coating is generally coated with UV-curable resin composition.

A typical sheet for hard coating can improve scratch resistance and thermal resistance, but has a drawback of film brittleness.

As a result, the sheet causes failure such as breakage, fragments, and the like due to lack of formability upon injection molding. Moreover, a typical sheet for hard coating has insufficient slip properties, thereby causing scratches in a post-process after injection molding.

DISCLOSURE

Technical Problem

It is an aspect of the present invention to provide a composition for hard coating capable of improving low-temperature formability and slip properties.

It is another aspect of the present invention to provide a sheet for forming a hard coating, which is capable of easily forming a hard coating on a surface of a molded article using the composition for hard coating.

Technical Solution

In accordance with one aspect of the present invention, a composition for hard coating includes a blend of a UV-curable resin having a (meth)acryloyl functional group and a bi- or higher valent polycarbonate polyol.

The polycarbonate polyol may be present in an amount of 0.1 parts by weight to 50 parts by weight based on 100 parts by weight of the UV-curable resin.

The composition may further include 1 part by weight to 15 parts by weight of a UV initiator or 0.1 parts by weight to 2 parts by weight of an antioxidant based on 100 parts by weight of the UV-curable resin In accordance with another aspect of the present invention, a method for preparing a composition for hard coating includes: preparing a (meth)acrylate copolymer having an epoxy functional group; reacting the (meth)acrylate copolymer with a (meth)acrylate monomer to prepare a UV-curable resin having an acryloyl functional group; blending the UV-curable resin with a bi- or higher valent polycarbonate polyol to prepare the composition.

In accordance with a further aspect of the present invention, a sheet for forming a hard coating includes a coating layer formed on one side thereof and containing a heat-cured product formed of the hard coating composition.

The sheet may further include a release layer between the coating layer and the sheet and an adhesive layer formed on the coating layer. In this case, the sheet may further include a printed layer or a deposition layer between the release layer and the coating layer or between the coating layer and the adhesive layer.

The sheet may further include an adhesive layer formed on the opposite side thereof. In this case, the sheet may further include a printed layer or a deposition layer between the adhesive layer and the sheet, or between the sheet and the coating layer.

Advantageous Effects

The sheet for forming a hard coating according to the invention is prepared from the composition for hard coating, which is prepared by blending a UV-curable resin having a (meth)acryloyl functional group with a bi- or higher valent polycarbonate polyol having a low molecular weight, thereby allowing primary heat-curing by the polycarbonate polyols and secondary UV curing by the (meth)acryloyl functional group.

Accordingly, when the sheet for forming a hard coating is attached to a molded article, a coating layer of the sheet is not in a completely cured state, thereby preventing separation of the coating layer from a curved section on the molded article or cracking of the coating layer.

In addition, the sheet for forming a hard coating according to the invention is prepared using the composition for hard coating, thereby improving low-temperature formability due to the low melting point of the polycarbonate polyol while securing outstanding slip properties through increase in crosslinking density.

BEST MODE

Figure 1:
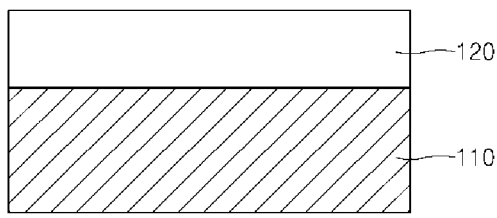
FIG. 1 is a schematic sectional view of a sheet for forming a hard coating in accordance with one embodiment of the present invention.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims.

Hereinafter, embodiments of the present invention will be described in more detail.

A composition for hard coating according to the present invention may be prepared by blending a UV-curable resin having a (meth)acryloyl functional group with a bi- or higher valent polycarbonate polyol.

The UV-curable resin having a (meth)acryloyl functional group allows the composition for hard coating to be cured by UV irradiation. In this invention, it is considered that UV curing is activated by reaction of the (meth)acryloyl functional group contained in the resin upon UV irradiation.

The UV-curable resin may have an epoxy equivalent weight of 200 g/eq to 20,000 g/eq and a (meth)acryloyl equivalent weight of 100 g/eq to 1,000 g/eq. Within these ranges of the epoxy equivalent weight and the (meth)acryloyl equivalent weight in the UV-curable resin, heat curing efficiency can be maximized while suitably suppressing adhesion after heat curing and providing excellent chemical resistance, wear resistance after UV curing, and the like.

In addition, the UV-curable resin may have a weight average molecular weight (Mw) of 5,000 to 100,000. If the weight average molecular weight of the UV-curable resin is less than 5,000, the composition can exhibit insufficient scratch resistance, wear resistance, and the like due to insufficient cohesion of polymer components. On the contrary, if the weight average molecular weight of the UV-curable resin exceeds 100,000, the composition undergoes gelling, thereby making it difficult to secure polymerization.

The polycarbonate polyol allows heat curing of the composition for hard coating according to the invention. In this invention, the term "heat curing" can be understood as reaction of a hydroxy group contained in the UV-curable resin and a hydroxyl group of the polycarbonate polyol with an isocyanate heat curing agent added in a coating process.

The polycarbonate polyol may have a number average molecular weight (Mn) of 10,000 or less and an OH value of 20 to 250. When the number average molecular weight (Mn) of the polycarbonate polyol exceeds 10,000, the molecular weight of the composition increases and the composition suffers from significant deterioration in surface properties due to decrease in crosslinking density upon heat curing. In addition, when the OH value of the polycarbonate polyol is less than 20, the composition has insufficient heat curing properties, causing significant deterioration in surface properties. On the contrary, when the OH value of the polycarbonate is 250 or more, the composition can provide slip properties due to increase in curing density. In this case, however, the film becomes brittle and thus is not suited for molding.

Further, the polycarbonate polyol may have a melting point of 80° C. or less. When the melting point of the polycarbonate polyol exceeds 80° C., the film becomes brittle and thus is not suited for molding due to increase in glass transition temperature of the coating layer in preparation of the sheet for forming a hard coating.

The polycarbonate polyol may be present in an amount of 0.1 parts by weight to 50 parts by weight based on 100 parts by weight of the UV-curable resin. When the amount of the polycarbonate polyol is less than 0.1 parts by weight based on 100 parts by weight of the UV-curable resin, the polycarbonate polyol provides insignificant influence on the glass transition temperature or other properties of the coating layer and thus does not provide low temperature formability and slip properties in preparation of the sheet for forming a hard coating. Further, when the amount of the polycarbonate polyol exceeds 50 parts by weight based on 100 parts by weight of the UV-curable resin, the composition includes an excess of the polycarbonate polyol having a low molecular weight, and thus has low reactivity upon UV curing of a final product, thereby providing insufficient surface properties.

The composition for hard coating according to the invention includes a solvent which disperse the UV-curable resin and the polycarbonate polyol. The solvent also functions to adjust viscosity of the composition.

Although not limited to a particular amount, the solvent may be present in an amount of about 50 parts by weight to about 200 parts by weight based on 100 parts by weight when taking dispersion and viscosity of the UV-curable resin and the like into account.

Further, the composition for hard coating may further include a UV initiator and an antioxidant.

Examples of the UV initiator may include benzoin, hydroxyketone, aminoketone, phosphine oxide initiators, and the like.

The UV initiator may be present in an amount of 1 part by weight to 15 parts by weight based on 100 parts by weight of the UV-curable resin. If the amount of the UV initiator is less than 1 part by weight based on 100 parts by weight of the UV-curable resin, the composition can suffer from insufficient reaction or require an excessively long curing time. Further, when the amount of the UV initiator exceeds 15 parts by weight based on 100 parts by weight of the UV-curable resin, the hard coating can suffer from deterioration in properties due to remaining initiator after curing.

Examples of the antioxidant may include phenolic antioxidants, phosphorous antioxidants, chelate antioxidants, and the like.

The antioxidant may be present in an amount of 0.1 parts by weight to 2 parts by weight based on 100 parts by weight of the UV-curable resin. When the amount of the antioxidant is less than 0.1 parts by weight based on 100 parts by weight of the UV-curable resin, the hard coating is likely to suffer from yellowing. Further, when the amount of the antioxidant exceeds 2 parts by weight based on 100 parts by weight of the UV-curable resin, the hard coating can have saturated antioxidation effects, whereas other properties of the hard coating can be deteriorated.

According to the invention, the composition for hard coating may further include at least one type of additive selected from among lubricants, UV absorbents, heat curing accelerators, fillers, isocyanate compounds, and the like, as needed.

Each of these additives may be present in an amount of 40 parts by weight or more based on 100 parts by weight of the UV-curable resin. That is, each of these additives may be suitably used in an amount of 40 parts by weight or less depending on application thereof. If a certain additive is present in a greater amount than a suitable amount in the composition, the hard coating can suffer from rapid deterioration in other properties as well as desired properties, such as peeling resistance, formability, and the like.

According to the invention, the composition for hard coating may be prepared by preparing a (meth)acrylate copolymer having an epoxy functional group, reacting the (meth)acrylate copolymer with a compound having a (meth)acryloyl functional group such as a (meth)acrylate monomer to prepare a UV-curable resin having an acryloyl functional group, and blending the prepared UV-curable resin with a bi- or higher valent polycarbonate polyol.

Here, the (meth)acrylate copolymer having an epoxy functional group may be prepared by copolymerization of methyl (meth)acrylate and glycidyl (meth)acrylate. Copolymerization of methyl (meth)acrylate and glycidyl (meth)acrylate may be realized in various ways such as solution polymerization, photopolymerization, bulk polymerization, and the like.

In addition, the amount of the (meth)acrylate monomer may be determined depending on the (meth)acryloyl equivalent weight in the UV-curable resin.

Further, in preparation of the composition, a UV curing agent, an antioxidant, and other additives may be added thereto.

FIG. 1 is a schematic sectional view of a sheet for forming a hard coating in accordance with one embodiment of the present invention.

Referring to FIG. 1, the sheet for forming a hard coating includes a base film 110 and a coating layer 120.

As used herein, the sheet for forming a hard coating is a sheet capable of forming a hard coating on a surface of a molded article in various manners, such as transferring, transferring simultaneously with injection, insert injection, attachment, and the like.

The base film 110 may be a resin film prepared using polypropylene, polyethylene, polyamide, polyester, polyacryl, polyvinyl chloride, acryl, polycarbonate, vinyl chloride, urethane, polyester resins, and the like. Further, the base film 110 may be prepared using a metal foil, such as an aluminum foul, a copper foil, and the like, or a cellulose sheet such as glassine paper, coated paper, cellophane, and the like.

The coating layer 120 may contain a heat cured product of the hard coating composition according to the invention. The heat cured product of the hard coating composition may be formed by treating the hard coating composition at about 100° C. to 170° C. for about 30 seconds to 2 minutes. The heat cured product of the coating layer 120 formed on one side of the base film 110 facilitates formation of a printed layer, a deposition layer, and the like on the sheet for forming a hard coating by suppressing adhesion of the sheet, while enhancing sheet handling properties.

The coating layer 120 may be formed to a thickness of 3 μm to 10 μm. If the thickness of the coating layer is less than 3 μm, the hard coating can suffer from deterioration in surface properties, that is, hardness, wear resistance, and the like. On the contrary, if the thickness of the coating layer exceeds 10 μm, the hard coating becomes brittle, thereby causing cracking upon molding while increasing manufacturing costs without any additional effects.

Figure 2:
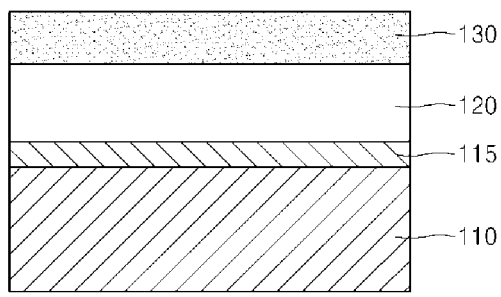
FIG. 2 is a schematic sectional view of a sheet for forming a hard coating in accordance with another embodiment of the present invention, showing a release type sheet for forming a hard coating.

FIG. 2 is a schematic sectional view of a sheet for forming a hard coating in accordance with another embodiment, showing a release type sheet for forming a hard coating.

Referring to FIG. 2, the sheet for forming a hard coating according to this embodiment includes a base film 110, a coating layer 120, a release layer 115, and an adhesive layer 130.

The coating layer 120 is formed on one side of the base film 110 and contains a heat cured product of the hard coating composition according to the invention.

The release layer 115 is interposed between the base film 110 and the coating layer 120 and allows release of the sheet for forming a hard coating from a molded article after the sheet is attached to the article.

The release layer 115 may be formed using a release agent such as epoxy, epoxy-melamine, aminoaklyd, acrylic, melamine, silicone, fluorine, cellulose, urea resin, polyolefin, paraffin-based agents, and the like.

The release layer 115 may have a thickness of 0.1 μm to 5 μm. If the thickness of the release layer is less than 0.1 μm, it is difficult for the release layer to secure release properties, and if the thickness of the release layer exceeds 5 μm, the release layer can suffer from cracking upon molding.

The adhesive layer 130 is formed on the coating layer 120 to allow the sheet for forming a hard coating to be attached to a molded article. The adhesive layer 130 may be formed using polyacryl, polystyrene, polyamide, chlorinated polyolefin, chlorinated ethylene-vinyl acetate copolymers, rubber resins, and the like.

To protect the adhesive layer 130, a protective film (not shown) may be formed on the adhesive layer 130.

In addition, the sheet for forming a hard coating may further include at least one of a printed layer and a deposition layer between the release layer 115 and the coating layer 120 or between the coating layer 120 and the adhesive layer 130 in order to provide decorative effects. Such a printed layer or deposition layer may be formed as a single layer or as two or more layers. In order to facilitate the formation of the printed layer, the sheet for forming a hard coating may further include a primer layer, which is formed before forming the printed layer and the like. Further, the deposition layer may be formed by vacuum deposition or sputtering.

Figure 3:
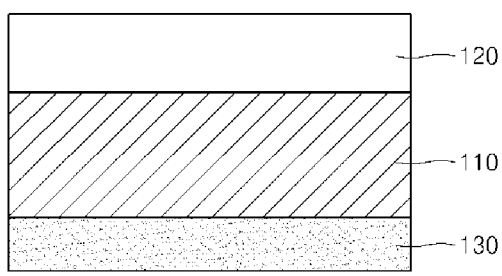
FIG. 3 is a schematic sectional view of a sheet for forming a hard coating in accordance with a further embodiment of the present invention, showing a non-release type sheet for forming a hard coating.

FIG. 3 is a schematic sectional view of a sheet for forming a hard coating in accordance with a further embodiment of the present invention, showing a non-release type sheet for forming a hard coating.

Referring to FIG. 3, the sheet according to this embodiment includes a base film 110, a coating layer 120, and an adhesive layer 130.

The coating layer 120 is formed on one side of the base film 110 and contains a heat cured product of the hard coating composition according to the invention.

Unlike the embodiment shown in FIG. 2, the adhesive layer 130 of this embodiment is formed on a side of the base film 110 opposite the side on which the coating layer 120 is formed, and serves to allow the sheet to be attached to a molded article.

In the embodiment shown in FIG. 3, the sheet for forming a hard coating may also further include a printed layer or a deposition layer to provide decorative effects. In this embodiment, the sheet may further include at least one of the printed layer and the deposition layer between the base film 110 and the adhesive layer 130 or between the base film 110 and the coating layer 120.

EXAMPLES

Next, characteristics of the sheet for forming a hard coating according to the invention will be described with reference to examples. Here, it should be understood that these examples are provided for illustration only and are not to be construed in any way as limiting the scope of the present invention.

Descriptions of details apparent to those skilled in the art will be omitted.

1. Preparation of Sheet

Example 1

Into a reactor provided with a stirrer, a cooling tube, a dropping lot and a nitrogen supply tube, 110 g of glycidyl methacrylate (GMA), 30 g of methyl methacrylate (MMA), 60 g of styrene, 1500 g of butyl acetate (BA) and 2.5 g of 2,2'-azobisisobutyronitrile (AIBN) were placed.

Then, the reaction system was heated to about 65° C. over about 1 hour under a nitrogen stream, and held at the same temperature for about 9 hours. Next, the mixture including 430 g of GMA, 120 g of MMA, 250 g of styrene, 5 g of lauryl mercaptan and 10 g of AIBN was dropped into the reactor over about 2 hours using the dropping lot under the nitrogen stream, and held at the same temperature for about 3 hours. Then, 2.5 g of AIBN was added to the mixture, and held at the same temperature for 2 hours. Then, with the temperature of the mixture adjusted to about 105° C., the nitrogen supply tube was replaced by an air supply tube, 370 g of acrylic acid (AA), 0.5 g of p-methoxy phenol and 0.4 g of dimethyl aminopyridine (DMAP) were mixed into the reactor, and maintained at 105° C. under air bubbling conditions. The mixture was held at the same temperature for 15 hours, and 0.5 g of p-methoxy phenol was added to the mixture, followed by cooling and adding methylethylketone until the mixture contained 30% of a non-volatile fraction, thereby preparing a UV-curable resin having an acryloyl functional group.

The prepared UV-curable resin had an epoxy equivalent weight of 6,600 g/eq and an acryloyl equivalent weight of 349 g/eq as measured by chemical titration, and a standard polystyrene converted weight average molecular weight of 60,000 as measured by GPC.

Next, 100 g of polycarbonate diol (PCDL), which has a melting point of 5° C. to 15° C., a number average molecular weight of 2,000 and an OH value of 40 to 60, 50 g of 1,6-hexaneisocyanate trimer, 80 g of a photoinitiator, 10 g of an antioxidant, 200 g of nanosilica and 700 g of methylethylketone were mixed with 1000 g of the prepared UV-curable resin, thereby preparing a composition for hard coating.

Then, a melamine release agent was coated to a thickness of about 1 μm on a backside of a 50 μm thick PET film by gravure coating to form a release layer. Then, the composition for hard coating was deposited to a thickness of about 6 μm on the release layer by gravure coating. Next, the deposited coating composition was heated at 150° C. for 30 seconds to form a coating layer containing a heat cured product of the hard coating composition, thereby preparing a sheet for forming a hard coating.

Comparative Example 1

A sheet for forming a hard coating was prepared in the same manner as in Example 1 excluding the polycarbonate diol.

Comparative Example 2

A sheet for forming a hard coating was prepared in the same manner as in Example 1 except that an acrylate polyol was used instead of the polycarbonate diol.

2. Property Evaluation (1) Evaluation of Low Temperature Formability

To provide decorative effects to each of the sheets prepared in Example 1 and Comparative Examples 1 and 2, a printed layer and an adhesive layer were formed on the sheet, followed by sufficient aging. Then, the sheet was maintained in a cold chamber at −10° C. for 1 hour and subjected to injection molding immediately after removing the sheet from the chamber. Then, the sheet was passed through a UV curing furnace and evaluated as to foamability.

(2) Evaluation of Slip Properties

To provide decorative effects to each of the sheets prepared in Example 1 and Comparative Examples 1 and 2, a printed layer and an adhesive layer were formed on the sheet, followed by sufficient aging. Then, the sheet was subjected to injection, and passed through a UV curing furnace, followed by evaluation of slip properties.

3. Evaluation Results

Table 1 shows evaluation results of the sheets for forming a hard coating prepared in Example 1 and Comparative Examples 1 and 2.

TABLE 1

| Property | Example 1 | Comparative Example 1 | Comparative Example 2 |
| --- | --- | --- | --- |
| Formability | ⊚ | Δ | X |
| Slip property | O | X | X |

(⊚: excellent, O: good, Δ: fair, X: fail)

Referring to Table 1, it can be seen that the sheet prepared in Example 1 has outstanding formability and slip properties as compared with the sheets prepared in Comparative Examples 1 and 2.

Although the present invention has been described with reference to some embodiments and the accompanying drawings, it will be understood by those skilled in the art that these embodiments are provided for illustrative purposes only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A composition for hard coating comprising:
    a blend of a UV-curable resin having a (meth)acryloyl functional group and a bi- or higher valent polycarbonate polyol;
    wherein the UV-curable resin has an epoxy equivalent weight of 200 g/eq to 20,000 g/eq and a (meth)acryloyl equivalent weight of 100 g/eq to 1,000 g/eq;
    wherein the polycarbonate polyol has a number-average molecular weight of 10,000 or less and an OH value of 20 to 250;
    wherein the polycarbonate polyol has a melting point of 80° C. or less; and
    wherein the polycarbonate polyol is present in an amount of 0.1 parts by weight to 50 parts by weight based on 100 parts by weight of the UV-curable resin.

2. The composition for hard coating according to claim 1, further comprising:
    an UV initiator present in an amount of 1 part by weight to 15 parts by weight based on 100 parts by weight of the UV-curable resin.

3. The composition for hard coating according to claim 1, further comprising:
    an antioxidant present in an amount of 0.1 parts by weight to 2 parts by weight based on 100 parts by weight of the UV-curable resin.

4. The composition for hard coating according to claim 1, further comprising:
    at least one additive selected from among lubricants, UV absorbents, heat curing accelerators, fillers and isocyanate compounds,
    wherein the additive is present in an amount of 40 parts or less by weight based on 100 parts by weight of the UV-curable resin.

5. The composition for hard coating according to claim 1, wherein the UV-curable resin has a weight average molecular weight of 5,000 to 100,000.

6. A method for preparing a composition for hard coating, comprising: preparing a (meth)acrylate copolymer having an epoxy functional group; reacting the (meth)acrylate copolymer with a (meth)acrylate monomer to prepare a UV-curable resin having an acryloyl functional group; and blending the UV-curable resin and a bi- or higher valent polycarbonate polyol to prepare the composition for hard coating according to claim 1.

7. The method according to claim 6, wherein the (meth) acrylate copolymer is prepared by copolymerization of methyl (meth)acrylate and glycidyl (meth)acrylate.

8. A sheet for forming a hard coating, comprising a coating layer formed on one side of the sheet and containing a heat-cured product of the composition according to claim 1.

9. The sheet according to claim 8, wherein the coating layer has a thickness of 3 μm to 10 μm.

10. The sheet according to claim 8, further comprising: a release layer between the coating layer and the sheet, and an adhesive layer formed on the coating layer.

11. The sheet according to claim 10, wherein the release layer has a thickness of 0.1 μm to 5 μm.

12. The sheet according to claim 10, further comprising: at least one of a printed layer and a deposition layer between the release layer and the coating layer, or between the coating layer and the adhesive layer.

13. The sheet according to claim 8, further comprising: an adhesive layer formed on the other side thereof.

14. The sheet according to claim 13, further comprising: at least one of a printed layer and a deposition layer between the adhesive layer and the sheet, or between the sheet and the coating layer.

15. The composition for hard coating according to claim 1, wherein the solvent is present in an amount in a range from 50 parts to 200 parts by weight based on 100 parts by weight of the UV-curable resin.

\* \* \* \* \*